US012715774B2

(12) United States Patent
Lee et al.

(10) Patent No.: US 12,715,774 B2
(45) Date of Patent: Aug. 25, 2026

(54) CARBON NANOTUBE MANUFACTURING METHOD AND CARBON NANOTUBE MANUFACTURED USING CARBON DIOXIDE

(71) Applicant: KOREA ADVANCED INSTITUTE OF SCIENCE AND TECHNOLOGY, Daejeon (KR)

(72) Inventors: Jae Woo Lee, Daejeon (KR); Byung Hoon Hwang, Daejeon (KR); Won Chan Yoon, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 616 days.

(21) Appl. No.: 18/304,425

(22) Filed: Apr. 21, 2023

(65) Prior Publication Data

US 2023/0406708 A1 Dec. 21, 2023

(30) Foreign Application Priority Data

Jun. 17, 2022 (KR) ........................ 10-2022-0074447

(51) Int. Cl.
*C01B 32/166* (2017.01)
*C01B 32/162* (2017.01)

(52) U.S. Cl.
CPC .......... *C01B 32/166* (2017.08); *C01B 32/162* (2017.08); *C01B 2202/32* (2013.01); *C01B 2202/36* (2013.01); *C01P 2002/72* (2013.01); *C01P 2002/74* (2013.01); *C01P 2002/82* (2013.01); *C01P 2004/03* (2013.01);
(Continued)

(58) Field of Classification Search
CPC . C01B 32/166; C01B 32/162; C01B 2202/32; C01B 2202/36; C01P 2002/72; C01P 2002/74; C01P 2002/82; C01P 2004/03; C01P 2004/04; C01P 2006/14; C01P 2006/16; B82Y 30/00; B82Y 40/00
See application file for complete search history.

(56) References Cited

U.S. PATENT DOCUMENTS

2009/0004095 A1* 1/2009 Yoon ...................... B82Y 30/00 423/447.2
2016/0023905 A1* 1/2016 Wei ......................... C01B 32/00 423/447.2
2020/0009536 A1* 1/2020 Noda ...................... B01J 35/45

FOREIGN PATENT DOCUMENTS

CN 101497436 A * 8/2009 ............. B01J 23/74
KR 10-2011-0037757 A 4/2011
(Continued)

OTHER PUBLICATIONS

English machine translationof WO2019164225 (2019).*
(Continued)

*Primary Examiner* — Richard M Rump
(74) *Attorney, Agent, or Firm* — Bridgeway IP Law Group, PLLC; Jihun Kim

(57) ABSTRACT

An embodiment of the disclosure provides a method for manufacturing a carbon nanotube using carbon dioxide and a carbon nanotube manufactured using carbon dioxide. Particularly, an embodiment of the disclosure provides a method for manufacturing a carbon nanotube using carbon dioxide to manufacture a uniform carbon nanotube with a small diameter by using a catalyst, a carbon raw material, and carbon dioxide, with a carbon nanotube manufactured using carbon dioxide.

15 Claims, 16 Drawing Sheets

(52) U.S. Cl.
CPC ...... *C01P 2004/04* (2013.01); *C01P 2006/14* (2013.01); *C01P 2006/16* (2013.01)

(56) References Cited

FOREIGN PATENT DOCUMENTS

| | | | | |
|---|---|---|---|---|
| KR | 10-2015-0110513 A | 10/2015 | | |
| KR | 10-2020-0071667 A | 6/2020 | | |
| WO | WO-2019164225 A1 * | 8/2019 | ............. | B01J 37/00 |

OTHER PUBLICATIONS

English machine translation of 101497436 (2009).*
Allaedini, Ghazaleh, Siti Masrinda Tasirin, and Payam Aminayi. "Synthesis of CNTs via chemical vapor deposition of carbon dioxide as a carbon source in the presence of NiMgO." Journal of Alloys and Compounds 647 (2015): 809-814.*
Niu, Jun Jie, et al. "An approach to carbon nanotubes with high surface area and large pore volume." Microporous and mesoporous materials 100.1-3 (2007): 1-5.*
Avramchuck, A. V., et al. "Influence of magnetic losses on microwave absorption by carbon-nanotube nanocomposites with a low concentration of ferromagnetic nanoparticles." (2016).*
Kim, Gi Mihn, et al. "Transformation of carbon dioxide into carbon nanotubes for enhanced ion transport and energy storage." Nanoscale 12.14 (2020): 7822-7833.*
Fei, L. I., Jin Cheng, and Hong-dan Zhang. "Preparation of carbon nanotubes by ethanol catalytic combustion technique using nickel salt as catalyst precursor." Transactions of Nonferrous Metals Society of China 16 (2006): s381-s384.*
Xu, Xiang-ju, and Shao-ming Huang. "Carbon dioxide as a carbon source for synthesis of carbon nanotubes by chemical vapor deposition." Materials Letters 61.21 (2007): 4235-4237.*

* cited by examiner

CARBON NANOTUBE MANUFACTURING METHOD AND CARBON NANOTUBE MANUFACTURED USING CARBON DIOXIDE

CROSS REFERENCE TO RELATED APPLICATION

The present application claims priority to Korean Patent Application No. 10-2022-0074447, filed Jun. 17, 2022, the entire contents of which is incorporated herein for all purposes by this reference.

BACKGROUND OF THE INVENTION

Field of the Invention

The disclosure relates to a method for manufacturing a carbon nanotube using carbon dioxide and a carbon nanotube manufactured using the carbon dioxide, and more particularly, to a method for manufacturing a uniform carbon nanotube with a small diameter using catalyst, carbon raw material and carbon dioxide and a carbon nanotube manufactured using carbon dioxide.

Description of the Related Art

Carbon dioxide is one of the greenhouse gases identified as a major contributor to climate change, and is generated in industrial facilities and residences as a by-product of combustion of fossil fuels. Recently, various attempts have been made to reduce carbon dioxide emissions by implementing global climate agreements and various policies, and through systems such as net zero carbon declaration and emission trading scheme for individuals and companies. In addition, various studies on the separation, capture, and utilization of generated carbon dioxide are being conducted. If more than 50 gigatons (GT) of carbon dioxides generated worldwide is separated, captured, and stored in the ocean, it can affect the pH of seawater and have a serious impact on the marine ecosystem. Further, even if the carbon dioxides are stored on the seabed, there remains a risk of carbon dioxides leaking into seawater due to natural phenomena such as earthquakes and tsunamis. This is the same problem for other lands and tunnels. Therefore, attempts are being made to reduce carbon dioxide emissions generated in the production process while producing high-value products by using carbon dioxide as a raw material for a product.

If carbon dioxides can be converted into other materials through chemical and physical methods, the effects of climate change due to global warming can be mitigated. Accordingly, studies are being conducted on methods for synthesizing carbon dioxides into various functional carbons such as porous carbon, graphene, and carbon nanotubes. However, these attempts not only require high energy costs but also have low yields, making them inefficient for scale-up as a commercial process.

Meanwhile, a process for producing a high-value carbon material using carbon dioxide as a raw material generally uses a high-temperature/high-pressure supercritical process. A method has been reported for synthesizing porous carbon from carbon dioxide using pure alkaline metals (Li, Na) at a pressure of 500° C. or more and 300 atm (Lingzhi Wei et al., *J. Am. Ceram. Soc.* 94:3078, 2011). In addition, a process for converting carbon dioxide into diamond at 440° C. and 800 atm using pure sodium has been reported (Zhengsong Lou et al., *J. Am. Chem. Soc.,* 125:9302, 2003). However, the high-temperature/high-pressure supercritical processes as described above have a disadvantage in that a lot of energy is required to reach the critical point.

Commercially, carbon nanotubes are being mass-produced using hydrocarbons as raw materials. This is achieved through a method of growing carbon nanotubes by reducing hydrocarbons to carbon at a high temperature of 600 degrees or higher on the surface of a metal catalyst through chemical vapor deposition. However, there is a problem in that carbon dioxide is generated to reach a high temperature.

Accordingly, the inventors of the disclosure have made efforts to solve the above problems, and as a result, have confirmed that carbon nanotubes can be produced more uniformly and in a large amount by introducing carbon dioxide as a raw material through the chemical vapor deposition method, and have completed the disclosure.

SUMMARY OF THE INVENTION

In order to solve the above problems, the technical object to be achieved by the disclosure is to provide a method for manufacturing a carbon nanotube using carbon dioxide, including a mixture solution preparation step of preparing a mixture solution by mixing a catalyst and a carbon raw material; and a heating step of heating the mixture solution in a gas environment containing carbon dioxide.

Another technical object to be achieved by the disclosure is to provide a carbon nanotube manufactured by the method for manufacturing the carbon nanotube using the carbon dioxide, wherein the carbon nanotube has a diameter of 30 to 200 nm.

The technical object to be achieved by the disclosure is not limited to the above-mentioned technical object, and other technical objects not mentioned can be clearly understood by those skilled in the art from the description below.

In order to achieve the above technical object, an embodiment of the disclosure provides a method for manufacturing a carbon nanotube using carbon dioxide, including a mixture solution preparation step of preparing a mixture solution by mixing a catalyst and a carbon raw material; and a heating step of heating the mixture solution in a gas environment containing carbon dioxide.

In an embodiment of the disclosure, the mixture solution preparation step includes a charge liquid preparation step of preparing a charge liquid by introducing the catalyst into the carbon raw material; and a dispersion preparation step of preparing a dispersion by dispersing the mixture solution.

In an embodiment of the disclosure, the catalyst is at least one selected from the group consisting of a transition metal and a transition metal salt.

In an embodiment of the disclosure, the catalyst is at least one selected from the group consisting of nickel, nickel dichloride, cobalt and nickel oxide.

In an embodiment of the disclosure, the catalyst has a particle size of 0.01 to 100 μm.

In an embodiment of the disclosure, the method further includes an obtaining step of obtaining a product after passing through the heating step; and a washing and a drying step of washing and drying the obtained product.

In an embodiment of the disclosure, the carbon raw material includes at least one selected from the group consisting of hydrocarbon and alcohol.

In an embodiment of the disclosure, the hydrocarbon is alkane.

In an embodiment of the disclosure, the alcohol is at least one selected from the group consisting of isopropyl alcohol, ethanol and glycerol.

In an embodiment of the disclosure, a heating temperature of the heating step is 600 to 1000° C.

In an embodiment of the disclosure, the dispersion in a dispersion step is performed by ultrasonic treatment or agitation by stirrers.

In order to achieve the above technical object, another embodiment of the disclosure provides a carbon nanotube manufactured by the method for manufacturing the carbon nanotube using the carbon dioxide, wherein the carbon nanotube has a diameter of 30 to 200 nm.

In an embodiment of the disclosure, the carbon nanotube has an $I_{2D}/I_D$ value of 0.2 to 1.0.

In an embodiment of the disclosure, the carbon nanotube has a surface area of 100 to 400 $m^2/g$.

In an embodiment of the disclosure, the carbon nanotube includes a micropore having a particle size of less than or equal to 2 nm and a mesopore having a particle size of greater than 2 nm and less than 50 nm, and the mesopore has a pore volume of 0.1 to 1.0 $cm^3/g$.

DETAILED DESCRIPTION OF THE INVENTION

Figure 1:
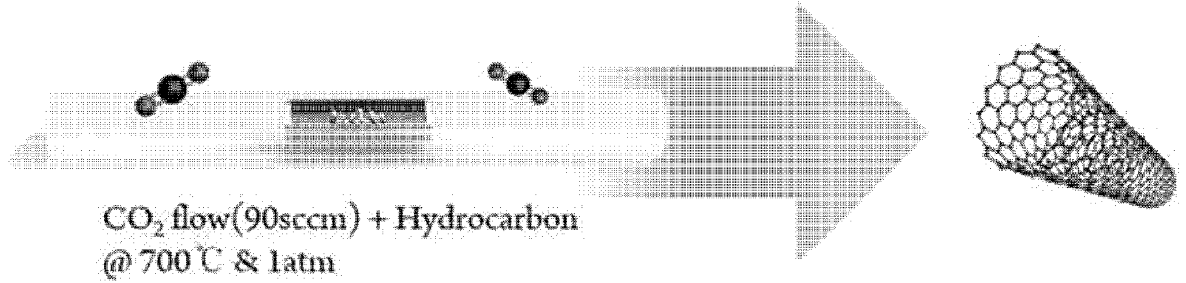
FIG. 1 is a diagram schematically illustrating a manufacturing process according to an embodiment of the disclosure.

Hereinafter, the disclosure will be explained with reference to the accompanying drawings. The disclosure, however, may be modified in various different ways, and should not be construed as limited to the embodiments set forth herein. Also, in order to clearly explain the disclosure, portions that are not related, to the disclosure are omitted, and like reference numerals are used to refer to like elements throughout.

Throughout the specification, it will be understood that when an element is referred to as being "connected (accessed, contacted, coupled) to" another element, it may be "directly connected to" the other element, or "indirectly connected" with other elements in between. Also, it will also be understood that when a component "includes" an element, unless stated otherwise, it Should be understood that the component does not exclude other elements.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Embodiments will hereinafter be described in detail with reference to the accompanying drawings.

In order to achieve the above technical object, an embodiment of the disclosure provides a method for manufacturing a carbon nanotube, including a mixture solution preparation step of preparing a mixture solution by mixing a catalyst and a carbon raw material; and a heating step of heating the mixture solution in a gas environment containing carbon dioxide.

In an embodiment of the disclosure, the mixture solution preparation step includes a charge liquid preparation step of preparing a charge liquid by introducing the catalyst into the carbon raw material; and a dispersion preparation step of preparing a dispersion by dispersing the mixture solution.

FIG. 1 is a diagram schematically illustrating a manufacturing process according to an embodiment of the disclosure.

Referring to FIG. 1, the catalyst of the charge liquid prepared by introducing the catalyst to the carbon raw material may be a carbon raw material of carbon nanotubes as well as the carbon raw material. The dispersion may widen the contact surface between the catalyst and the gas containing the carbon dioxide. By heating the dispersion in a gas environment containing carbon dioxide, a reaction for generating carbon nanotubes may be caused or accelerated, and carbon nanotubes may be manufactured in a more uniform and higher yield than those manufactured in other gas environments. The mixed weight ratio of the catalyst and the carbon raw material present in the charge liquid may be 1:5 to 1:50.

In an embodiment of the disclosure, the catalyst may be at least one selected from the group consisting of a transition metal and a transition metal salt. Carbon nanotubes can be manufactured in high yield by using at least one catalyst selected from the group consisting of the transition metal and the transition metal salt.

In an embodiment of the disclosure, the catalyst may be at least one selected from the group consisting of nickel, nickel dichloride, cobalt, and nickel oxide.

In an embodiment of the disclosure, the catalyst may have a particle size of 0.01 to 100 μm. In the case that the particle size of the catalyst is smaller than 0.01 μm, the particle size of the carbon nanotubes may not be uniform, or the yield may be low, or the growth of the carbon nanotubes may not be performed smoothly. In the case that the particle size of the catalyst is larger than 100 μm, there may not be a significant effect on the growth of carbon nanotubes.

In an embodiment of the disclosure, the method may further include an obtaining step of obtaining a product after passing through the heating step; and a washing and drying step of washing and drying the obtained product. The main purpose of the washing step is to remove salts remaining in the carbon nanotube powder of the product after the heating step, and the solution used during the washing may be hydrochloric acid, distilled water and ethanol, and the hydrochloric acid, distilled water and ethanol may be used sequentially. The drying is preferably performed at a temperature of 150° C. or lower.

In an embodiment of the disclosure, the carbon raw material may include at least one selected from the group consisting of hydrocarbons and alcohols. The hydrocarbon may be a carbon source of carbon nanotubes. The alcohol may be a carbon raw material of carbon nanotubes and may smoothly disperse the catalyst.

In an embodiment of the disclosure, the hydrocarbon may be an alkane. Preferably, the hydrocarbon may be an alkane having 5 or more carbon atoms, and more preferably, hexane.

In an embodiment of the disclosure, the alcohol may be at least one selected from the group consisting of isopropyl alcohol, ethanol and glycerol. The isopropyl alcohol, ethanol and glycerol may be used alone or in combination. A hydrocarbon may be mixed with the alcohol and used. The hydrocarbon may be an alkane, preferably an alkane having 5 or more carbon atoms, and more preferably hexane.

In an embodiment of the disclosure, the heating temperature of the heating step may be 600 to 1000° C. In the case that the temperature is lower than 600° C., the carbon nanotubes may not be uniform and the yield may be low. In the case that the heating temperature is higher than 1000° C., a significant effect may not exist. Preferably, the heating temperature may be 650 to 1000° C., more preferably 670 to 1000° C. The heating rate of the temperature may be 1 to 10° C. $min^{-1}$, preferably 2 to 5° C. $min^{-1}$.

In an embodiment of the disclosure, the dispersion in the dispersion preparation step may be performed by ultrasonic treatment or agitations by stirrers. The dispersion time may be 1 hour or more. In the case that the dispersion time is less than 1 hour, dispersion may not occur.

In order to achieve the above technical object, another embodiment of the disclosure provides a multi-walled carbon nanotube that is manufactured by the method for manufacturing the carbon nanotube using the carbon dioxide, and has a diameter of 30 to 200 nm.

In an embodiment of the disclosure, the carbon nanotube may have an $I_{2D}/I_D$ value of 0.2 to 1.0. A D-Raman peak is observed around 1350 $cm^{-1}$ and a 2D-Raman peak is observed around 2680 $cm^{-1}$, which means the presence of defects in the graphene structure and 2-phonon scattering, respectively. The $I_{2D}/I_D$ value may be an indicator of the defectivity of multi-walled carbon nanotube. In the case that the $I_{2D}/I_D$ value is 0.2 to 1.0, it may indicate that the carbon nanotube has few defects. The $I_{2D}/I_D$ value may be preferably 0.2 to 0.9, more preferably 0.2 to 0.8.

In an embodiment of the disclosure, the carbon nanotube may have a surface area of 100 to 400 $m^2/g$.

In an embodiment of the disclosure, the carbon nanotube includes a micropore having a particle size of less than or equal to 2 nm and a mesopore having a particle size of greater than 2 nm and less than 50 nm, and the mesopore has a pore volume of 0.1 to 1.0 $cm^3/g$.

Hereinafter, the embodiments are illustrated in more detail with reference to examples. It should be understood, however, that the following examples are for purposes of illustration only and are not intended to limit the scope.

Example 1: Synthesis of Carbon Nanotubes Using Catalysts and Hydrocarbons in a Carbon Dioxide Gas Environment After putting 1 g of nickel catalyst powder into 30 ml of isopropyl alcohol, the mixture was dispersed by ultrasonic treatment for 1 hour to 3 days. After putting the dispersion in an alumina boat and putting the alumina boat in an alumina tube, 90 sccm of carbon dioxide (99.999%) was flowed and heated at a temperature of 700° C. to obtain a black powder in which nickel catalyst particles and carbon nanotubes were mixed. The obtained power was washed to remove impurities using 5M HCl, water, and ethanol. When the washed product was dried in an oven at 80° C. for more than 10 hours, carbon nanotube powder was obtained. Here, the yield based on the mass of the nickel catalyst was 108% to 237%.

Figure 2:
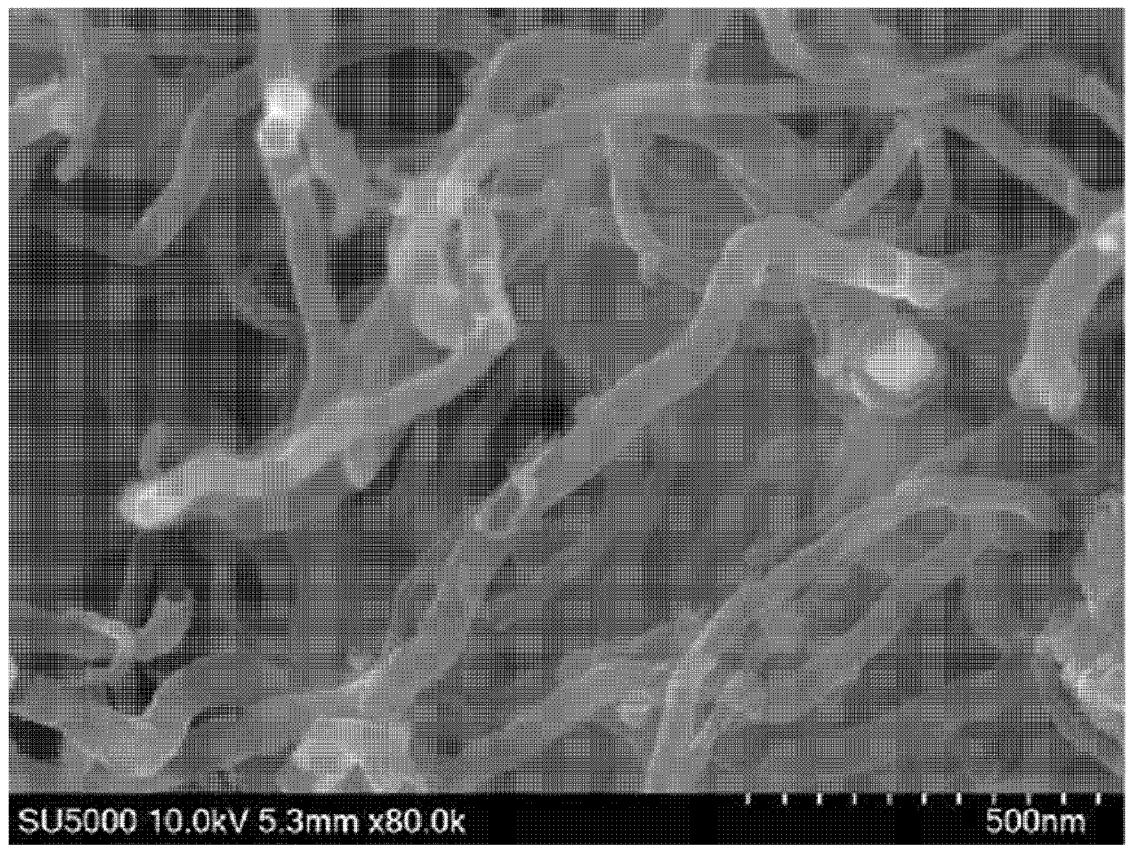
FIG. 2 is a diagram illustrating a SEM picture of a carbon nanotube sample synthesized using a nickel catalyst, isopropyl alcohol, and a gas containing carbon dioxide in Example 1 of the disclosure.
Figure 3:
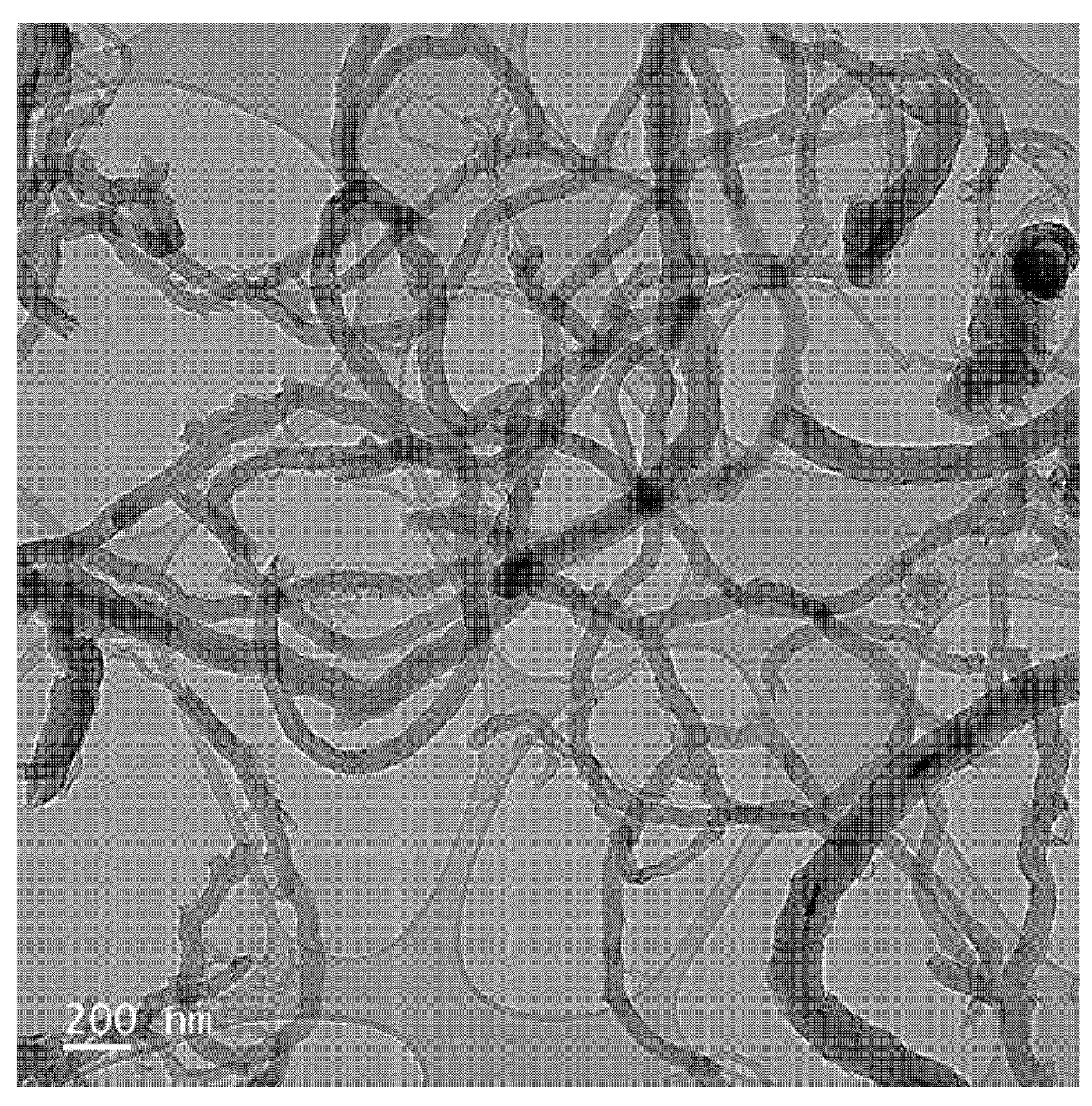
FIG. 3 is a diagram illustrating a TEM image of a carbon nanotube sample synthesized using a nickel catalyst, isopropyl alcohol, and carbon dioxide in Example 1 of the disclosure.
Figure 4:
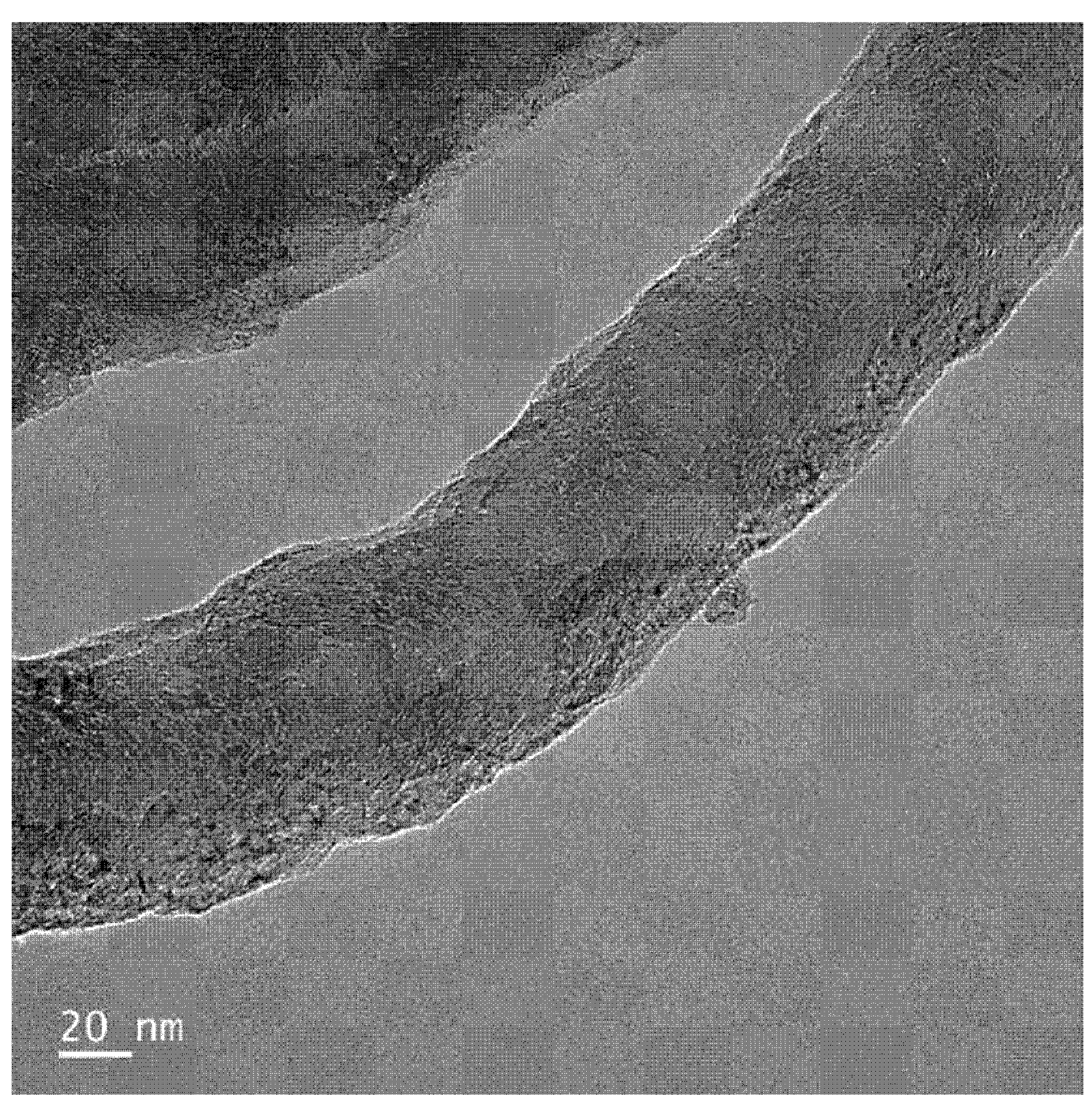
FIG. 4 is a diagram illustrating an enlarged TEM image of a carbon nanotube sample synthesized using a nickel catalyst, isopropyl alcohol, and carbon dioxide in Example 1 of the disclosure.

SEM and TEM images for the obtained carbon nanotubes are illustrated in FIGS. 2 to 4, respectively. It can be confirmed from the SEM image of FIG. 2 that the carbon nanotubes were agglomerated, and it can be confirmed from the TEM images of FIGS. 3 and 4 that the carbon nanotubes were uniformly formed in the range of 50 to 60 nm in diameter as multi-walled carbon nanotubes.

Figure 5:
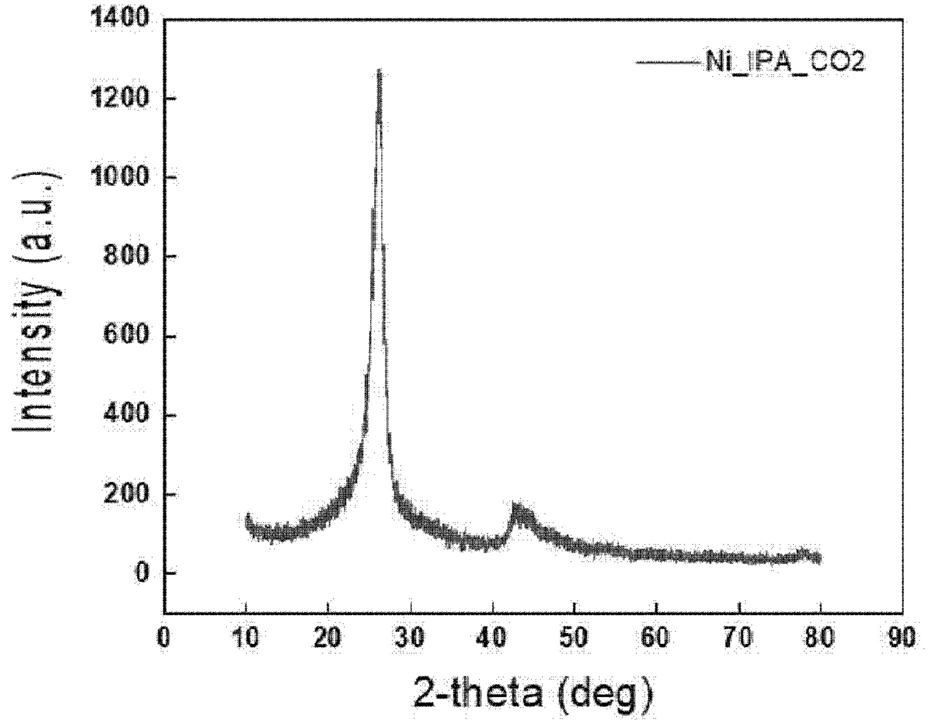
FIG. 5 is a diagram illustrating an XRD graph of a sample obtained in Example 1 of the disclosure.

FIG. 5 illustrates an XRD graph of the synthesized carbon nanotubes. It illustrates that a C(002) peak, which means carbon nanotubes, was well developed, proving that carbon nanotubes were successfully synthesized.

Figure 6:
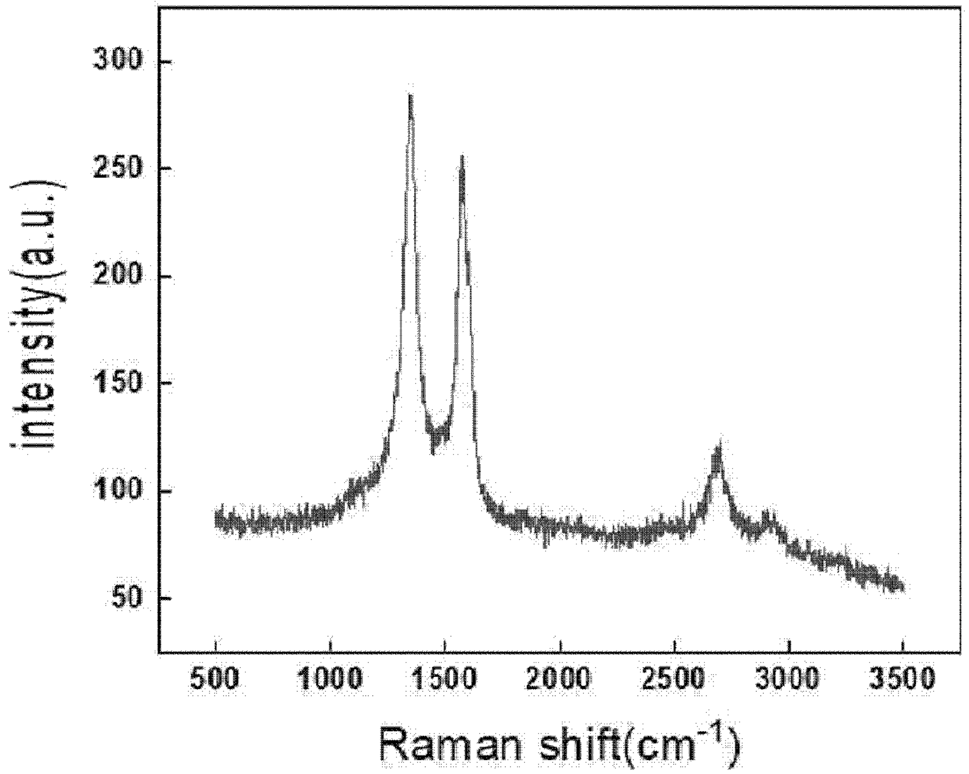
FIG. 6 is a graph illustrating a Raman analysis result of a sample obtained in Example 1 of the disclosure.

FIG. 6 is a graph of Raman analysis of the synthesized carbon nanotubes. The D-Raman peak was observed around 1350 $cm^{-1}$ and the 2D-Raman peak was observed around 2680 $cm^{-1}$, which indicated the existence of defects in the graphene structure and the secondary scattering in which two D-mode phonons were emitted, respectively. The $I_{2D}/I_D$ value may be an index indicating defects of multi-walled carbon nanotubes. As a result of the analysis, the value of $I_{2D}/I_D$ was 0.2 to 1.0, indicating that the synthesized carbon nanotubes had few defects.

Figure 7:
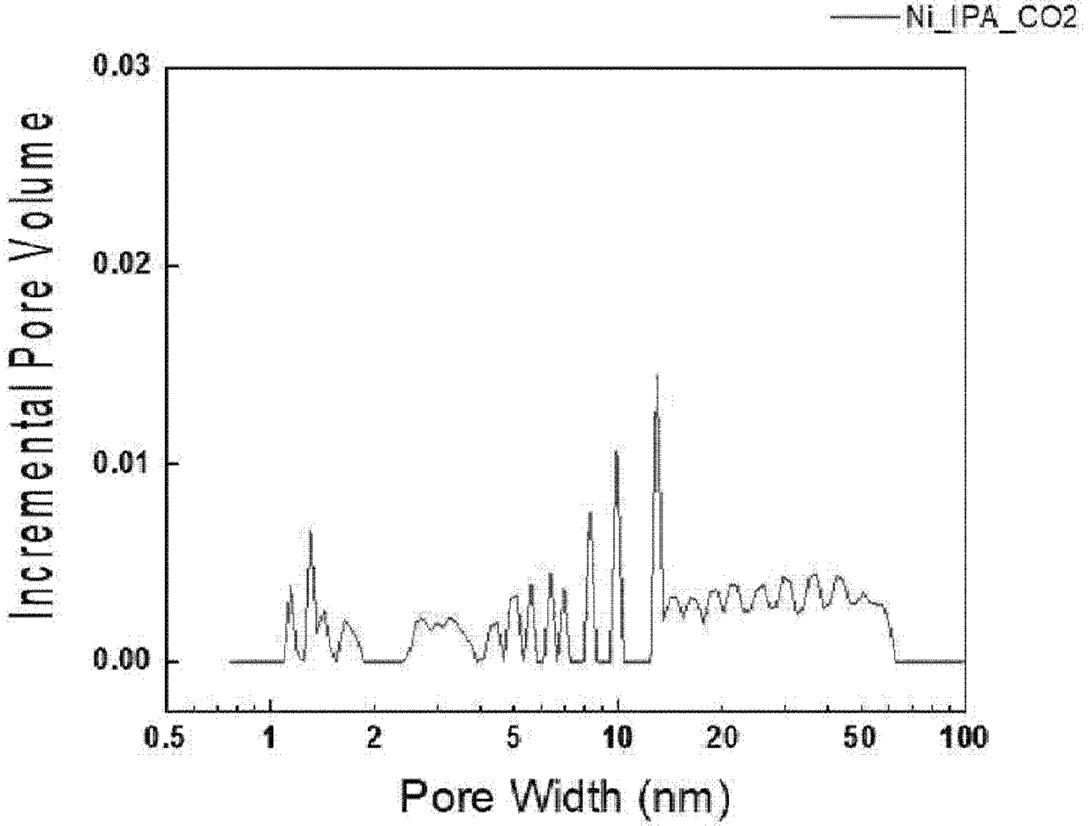
FIG. 7 is a diagram illustrating a pore distribution graph of a sample obtained in Example 1 of the disclosure.

FIG. 7 is a distribution chart of surface area and pore size in the synthesized carbon nanotubes. The surface area was measured through adsorption and desorption of nitrogen gas at 77 K by a Brunaure Emmett Teller (BET) equipment. The size of the surface area showed values ranging from 100 to 400 $m^2/g$. Reviewing the distribution of pores, it can be confirmed that the pores were distributed in a micropore area having the sizes of 1 nm (pore size <2 nm) and a mesopore area (50 nm>pore size>2 nm). It can be confirmed that the mesopore had a pore volume of 0.1 to 1.0 $cm^3/g$.

Example 2: Synthesis of Carbon Nanotubes Using Catalysts and Hydrocarbons in Different Gas Environments Under the same condition of Example 1, carbon nanotubes were synthesized by changing the gas to argon, air, and mixed gas of carbon dioxide and nitrogen (the mass ratio of carbon dioxide:nitrogen=1:1). The nickel metal catalyst, the isopropyl alcohol and other experimental conditions were used the same as in Example 1. Here, the yield of the carbon nanotubes synthesized in the argon gas environment was 50 to 100% based on the mass of the nickel catalyst, the yield of the carbon nanotubes synthesized in the air environment was 80% based on the mass of the nickel catalyst, and the yield of the carbon synthesized in the mixed gas environment of carbon dioxide and nitrogen was about 100 to 150% based on the mass of the nickel catalyst.

Figure 8:
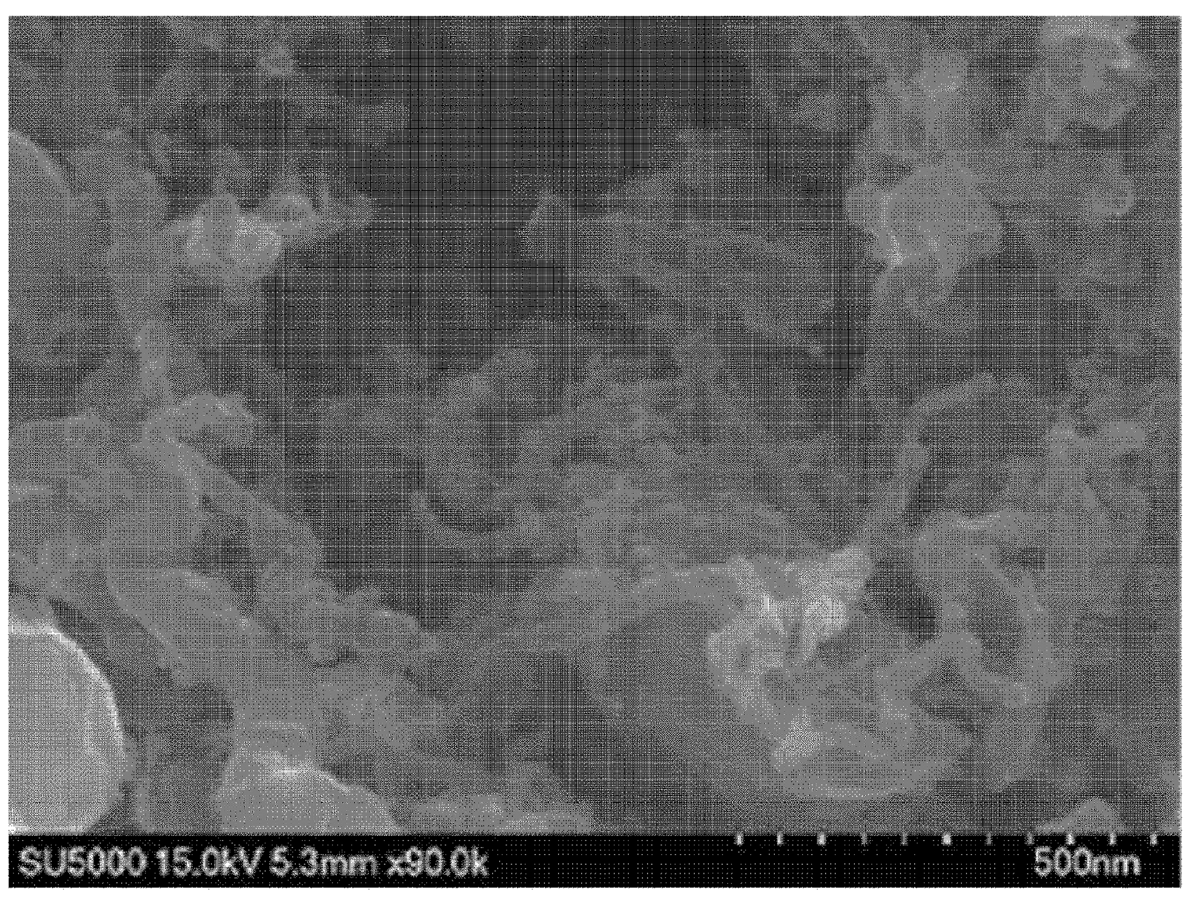
FIG. 8 is a diagram illustrating a SEM picture of a carbon nanotube sample synthesized using a nickel catalyst and isopropyl alcohol in an argon gas environment in Example 2 of the disclosure.

FIG. 8 illustrates a SEM image of the carbon nanotubes synthesized in the argon gas environment. It can be confirmed that the carbon nanotubes were agglomerated.

Figure 9:
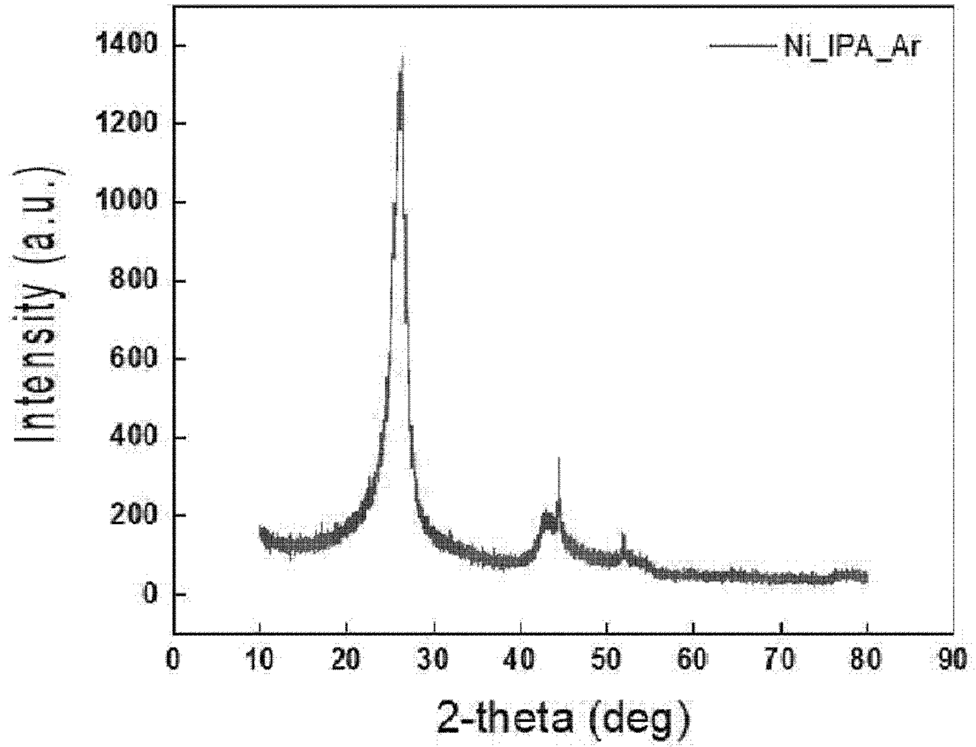
FIG. 9 is a diagram illustrating an XRD graph of a carbon nanotube sample synthesized using a nickel catalyst and isopropyl alcohol in an argon gas environment in Example 2 of the disclosure.

FIG. 9 illustrates an XRD graph of the carbon nanotubes synthesized in the argon gas environment. It illustrates that the C(002) peak, which means carbon nanotubes, was well developed, proving that the carbon nanotubes were successfully synthesized.

Figure 10:
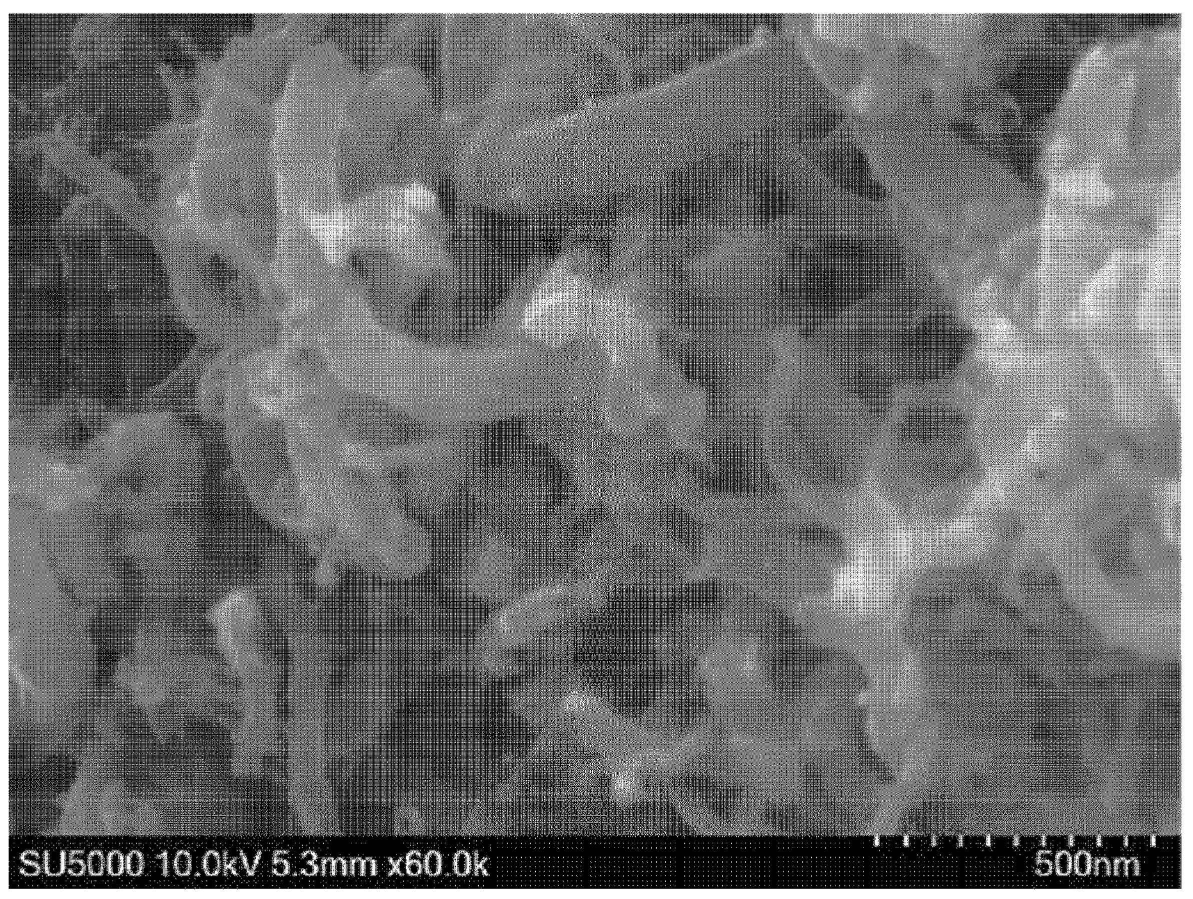
FIG. 10 is a diagram illustrating a SEM image of a carbon nanotube sample synthesized using a nickel catalyst and isopropyl alcohol in an air environment in Example 2 of the disclosure.

FIG. 10 illustrates a SEM image of the carbon nanotubes synthesized in the air environment. It can be confirmed that the carbon nanotubes were agglomerated.

Figure 11:
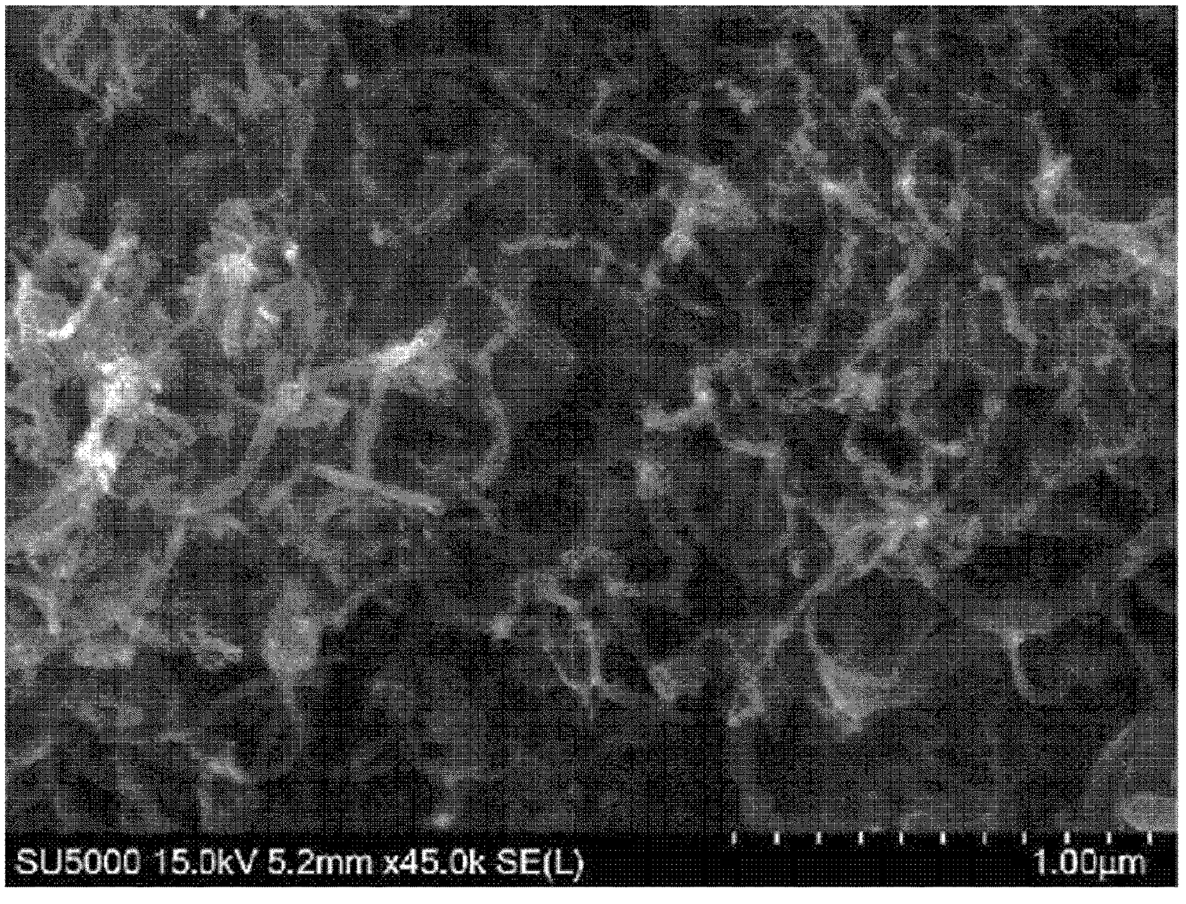
FIG. 11 is a diagram illustrating a SEM image of a carbon nanotube sample synthesized using a nickel catalyst and isopropyl alcohol in a carbon dioxide and nitrogen mixture gas environment in Example 2 of the disclosure.

FIG. 11 illustrates a SEM image of the carbon nanotubes synthesized in the mixed gas environment of carbon dioxide and nitrogen. It can be confirmed that the carbon nanotubes were agglomerated.

Through Example 2, it can be confirmed that when synthesizing carbon nanotubes in a gas environment different from the carbon dioxide-containing gas environment, the synthesis yield of the carbon nanotubes in the carbon dioxide-containing gas environment is excellent.

Example 3: Synthesis of Carbon Nanotubes Using Hydrocarbon and Carbon Dioxide Gas in Different Catalysts Under the condition of Example 1, carbon nanotubes were synthesized by changing the nickel metal catalyst to nickel dichloride, cobalt, and nickel oxide. The carbon dioxide gas environment, the isopropyl alcohol and other experimental conditions were used the same as in Example 1. Here, the yield of the carbon nanotubes synthesized with the nickel dichloride catalyst was 45% based on the mass of the catalyst, the yield of the carbon nanotubes synthesized with the cobalt catalyst was 60% based on the mass of the catalyst, and the yield of the carbon nanotubes synthesized with the nickel oxide catalyst was about 120% based on the mass of the catalyst.

Figure 12:
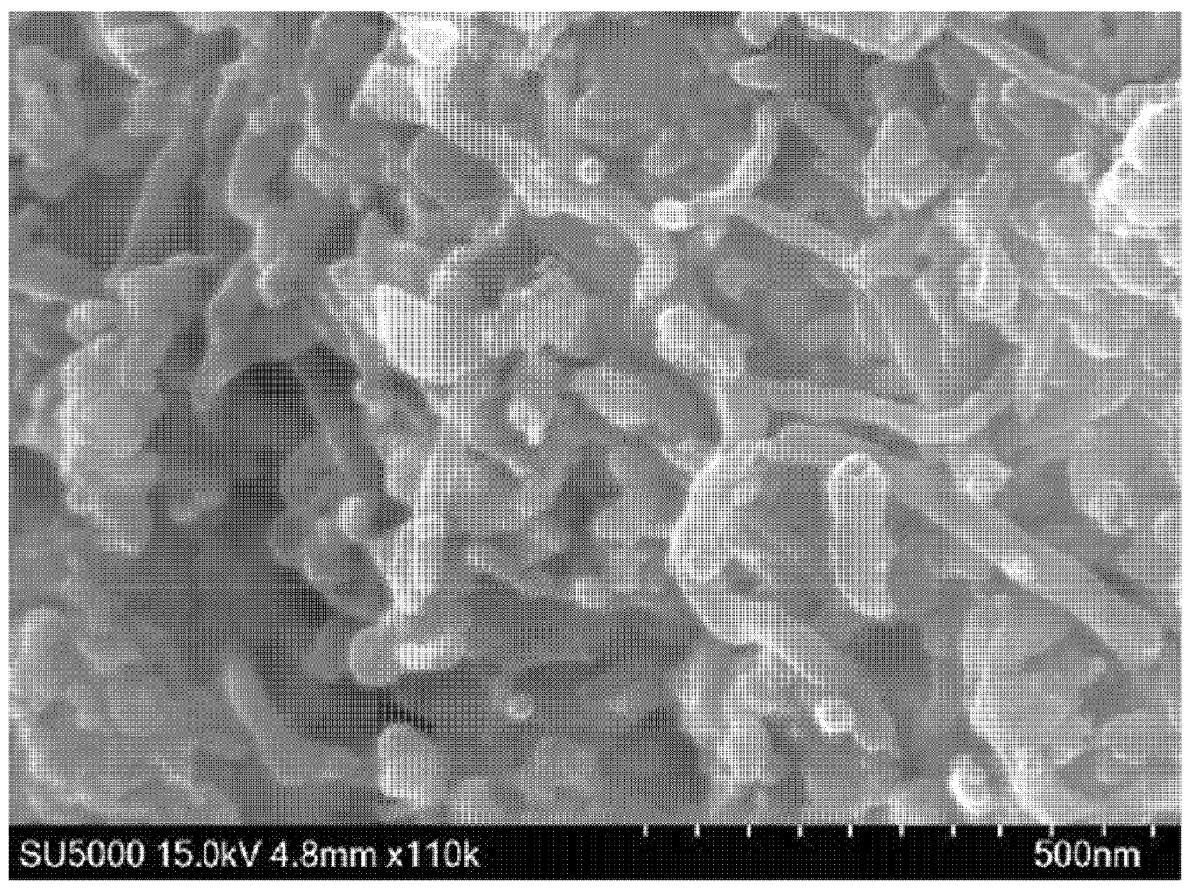
FIG. 12 is a diagram illustrating a SEM image of a carbon nanotube sample synthesized using isopropyl alcohol in a carbon dioxide gas environment when a nickel dichloride catalyst was used in Example 3 of the disclosure.

FIG. 12 illustrates a SEM image when the nickel dichloride catalyst was used. It can be confirmed that the carbon nanotubes were agglomerated.

Figure 13:
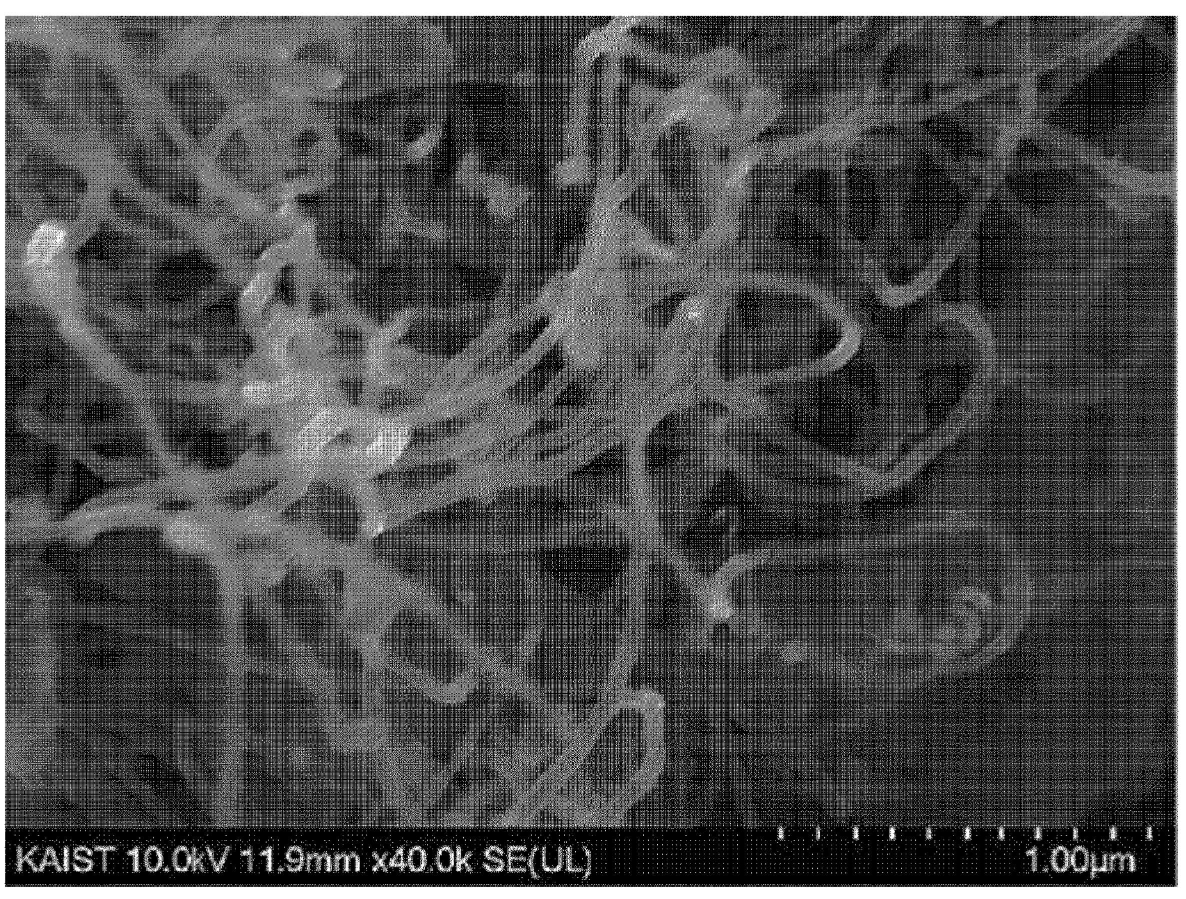
FIG. 13 is a diagram illustrating a SEM image of a carbon nanotube sample synthesized using isopropyl alcohol in a carbon dioxide gas environment when a cobalt catalyst was used in Example 3 of the disclosure.

FIG. 13 illustrates a SEM image when the cobalt catalyst was used. Long carbon nanotube strands were identified.

Figure 14:
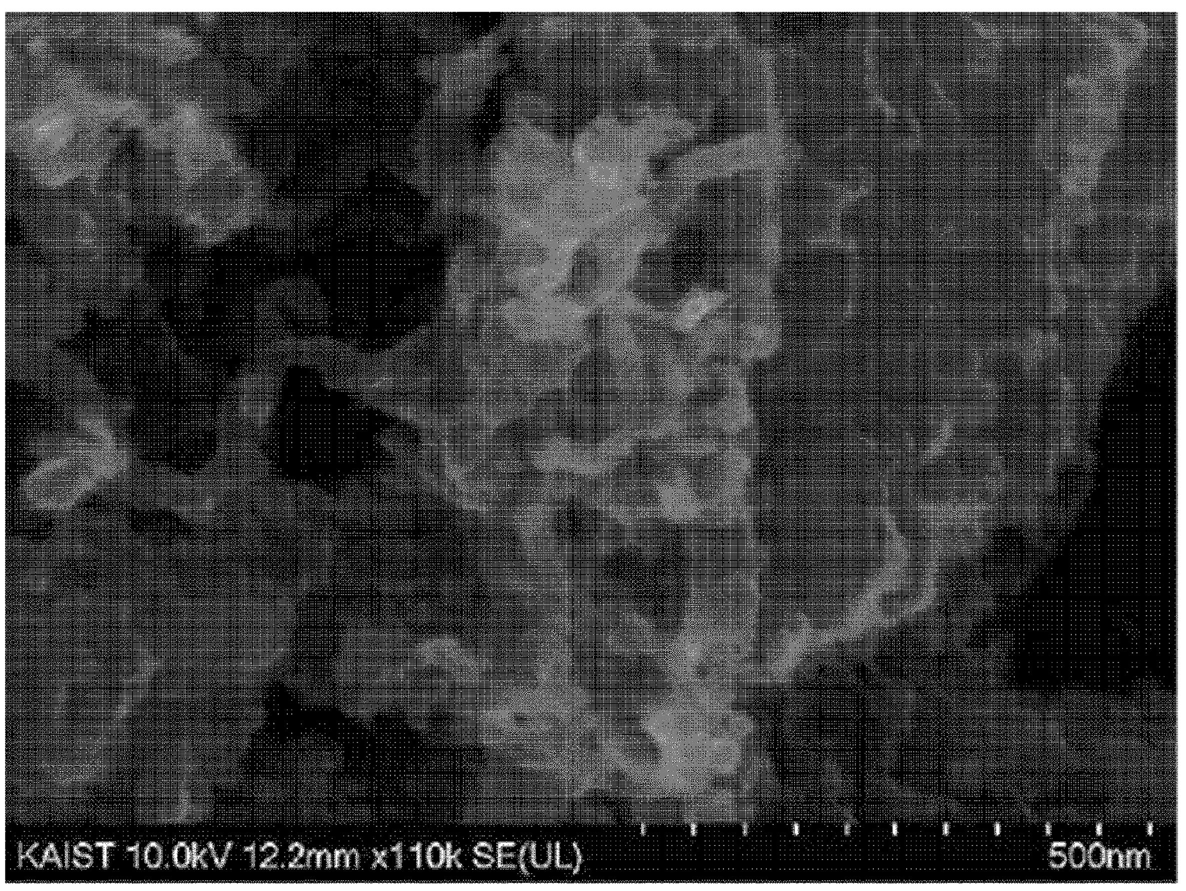
FIG. 14 is a diagram illustrating a SEM image of a carbon nanotube sample synthesized using isopropyl alcohol in a carbon dioxide gas environment when a nickel oxide catalyst was used in Example 3 of the disclosure.

FIG. 14 illustrates a SEM photograph when the nickel oxide catalyst was used. It can be confirmed that the carbon nanotubes were agglomerated.

Through Example 3, it can be confirmed that carbon nanotubes can be synthesized by reacting carbon dioxide and hydrocarbons in various catalysts.

Example 4: Synthesis of Carbon Nanotubes with Catalysts Using Different Hydrocarbons in a Carbon Dioxide Gas Under the conditions of Example 1, the experiments were conducted by changing isopropyl alcohol to ethanol, glycerol, and hexane. The nickel catalyst, the carbon dioxide gas environment, and other experimental conditions were used the same as in Example 1. Here, the yield of the carbon nanotubes synthesized with ethanol was 170% based on the mass of the nickel catalyst, the yield of the carbon nanotubes synthesized with glycerol was 110% based on the mass of the nickel catalyst, and the yield of the carbon nanotubes synthesized with a mixture solution of hexane and isopropyl alcohol (the volume ratio of hexane:isopropyl alcohol=1:1) was about 60% based on the mass of the nickel catalyst.

Figure 15:
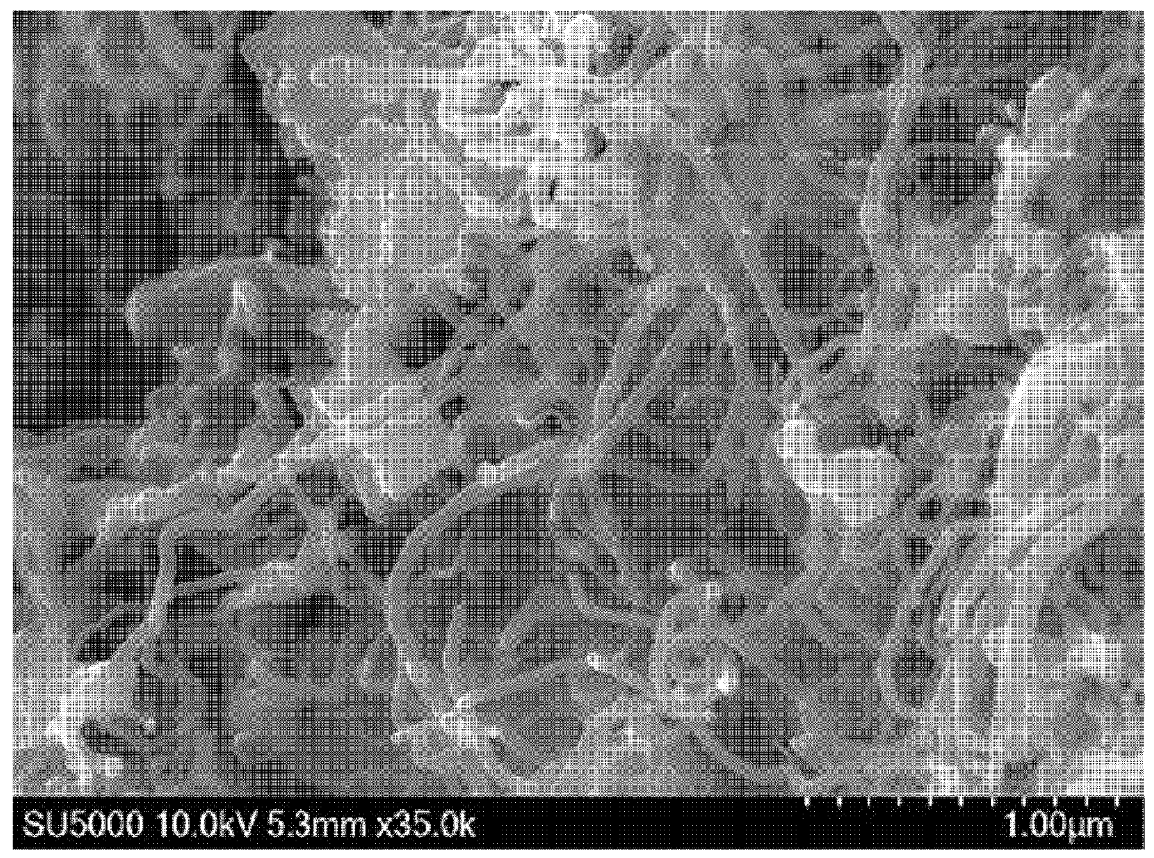
FIG. 15 is a diagram illustrating a SEM image of a carbon nanotube sample synthesized using a nickel catalyst in a carbon dioxide gas environment when ethanol was used in Example 4 of the disclosure.

FIG. 15 illustrates a SEM image of the carbon nanotubes synthesized using ethanol. It can be confirmed that the carbon nanotubes were agglomerated.

Figure 16:
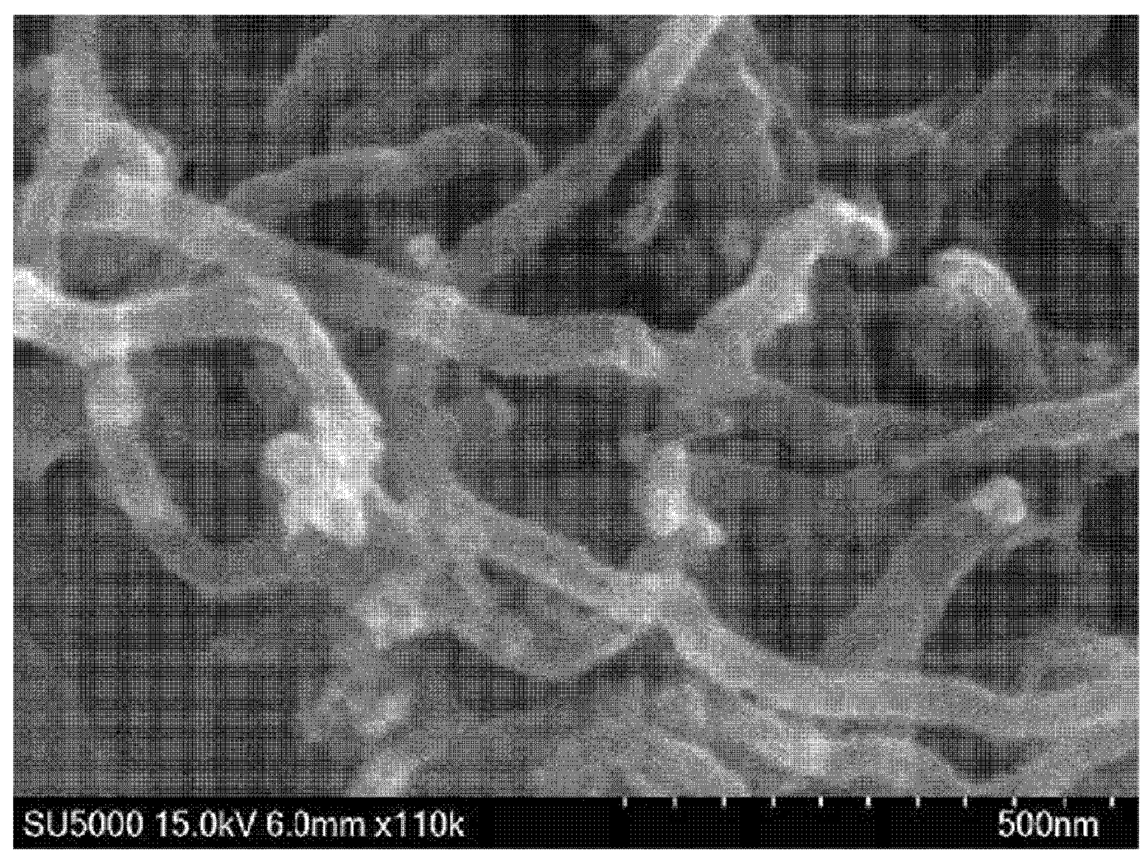
FIG. 16 is a diagram illustrating a SEM image of a carbon nanotube sample synthesized using a nickel catalyst in a carbon dioxide gas environment when glycerol was used in Example 4 of the disclosure.

FIG. 16 illustrates a SEM image of the carbon nanotube synthesized using glycerol. It can be confirmed that the carbon nanotubes were agglomerated.

Figure 17:
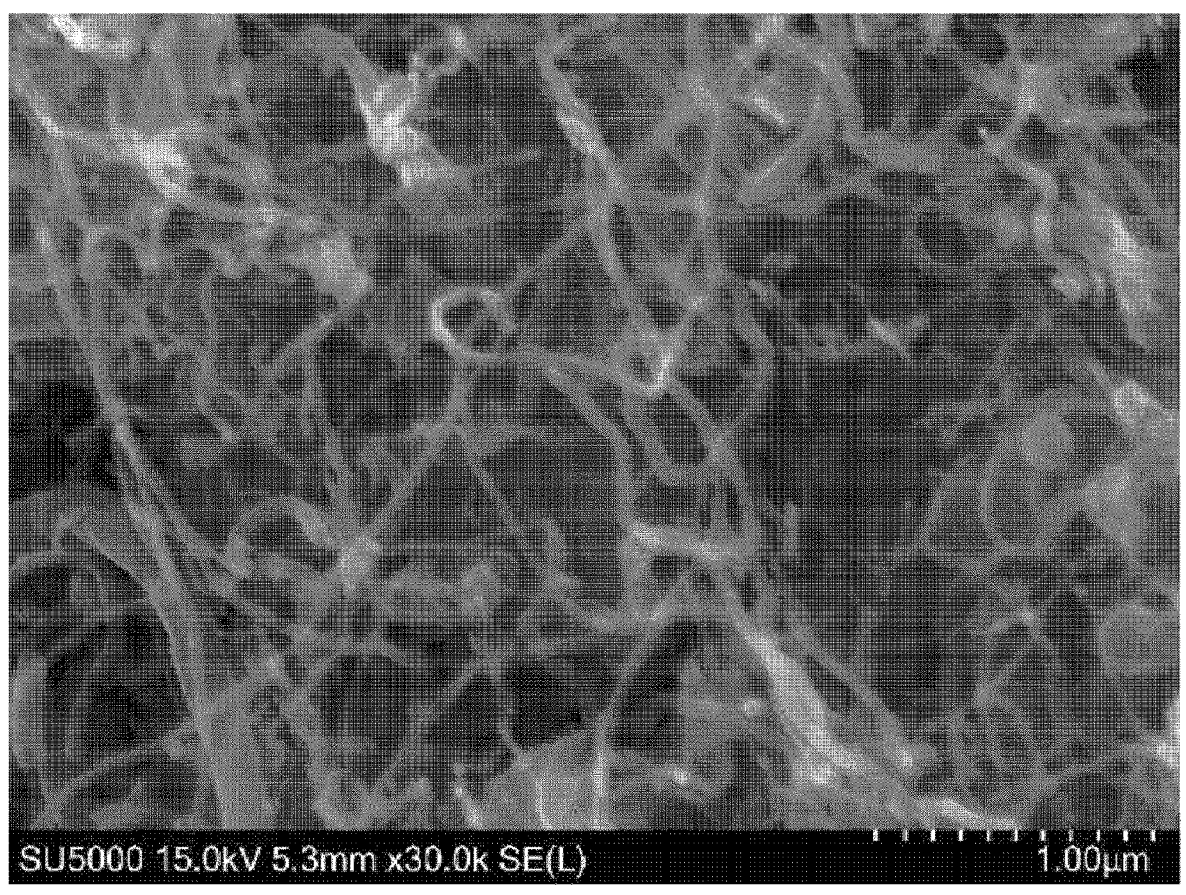
FIG. 17 is a diagram illustrating a SEM image of a carbon nanotube sample synthesized using a nickel catalyst in a carbon dioxide gas environment when a mixture of hexane and isopropyl alcohol was used in Example 4 of the disclosure.

FIG. 17 illustrates a SEM image of the carbon nanotube synthesized using the mixture solution of hexane and isopropyl alcohol. It can be confirmed that the carbon nanotubes were agglomerated.

Through Example 4, it can be confirmed that carbon nanotubes can be used in the carbon dioxide gas by using various hydrocarbons.

The description of the disclosure provided above is illustrative; it is to be appreciated that a person of ordinary skill in the field of art to which the disclosure pertains can easily provide modifications implemented in specific forms without departing from the technical spirit of the disclosure or altering the essential features of the disclosure. Thus, it should be understood that the embodiments disclosed in the foregoing are illustrative in all aspects and do not limit the scope of the disclosure. For example, an element described as having an integrated form can be implemented in a distributed form, and likewise, an element described as having a distributed form can be implemented in an integrated form.

The scope of the disclosure is to be defined by the scope of claims provided below, and all variations or modifications that can be derived from the meaning and scope of the claims as well as their equivalents are to be interpreted as being encompassed within the scope of the disclosure.

According to an embodiment of the disclosure, it is possible to manufacture carbon nanotubes in a carbon dioxide-containing gas by implementing a method for manufacturing a carbon nanotube using carbon dioxide. In addition, the disclosure is an economical process capable of saving energy compared to conventional manufacturing processes by synthesizing the carbon nanotubes from carbon dioxide under mild condition of atmospheric pressure.

In the disclosure, when the carbon dioxide-containing gas is flowed through the catalyst and hydrocarbons at a temperature of 600° C. or, higher, more uniform and higher yields of carbon nanotubes can be manufactured compared to other cases.

In addition, the manufacturing method of the disclosure is economical and eco-friendly because it can manufacture high-value carbon nanotubes by using carbon dioxide while preventing the emission of carbon dioxide into the atmosphere.

It should be appreciated that the effects of the disclosure are not restricted to the one set forth herein, but encompass all effects that can be derived from the configurations disclosed in the detailed description or the appended claims.

What is claimed is:

1. A method for manufacturing a carbon nanotube using carbon dioxide, the method comprising:

preparing a mixture solution by mixing a catalyst and a carbon raw material; and heating the mixture solution in a gas environment containing carbon dioxide, wherein the carbon raw material and the carbon dioxide are carbon sources for the carbon nanotube.

2. The method of claim 1, wherein the preparing the mixture solution comprises:

preparing a first liquid by introducing the catalyst into the carbon raw material; and preparing a dispersion liquid by dispersing the first liquid, the dispersion liquid being the mixture solution.

3. The method of claim 1, wherein the catalyst is at least one selected from a group consisting of a transition metal and a transition metal salt.

4. The method of claim 1, wherein the catalyst is at least one selected from a group consisting of nickel, nickel dichloride, cobalt, and nickel oxide.

5. The method of claim 1, wherein the catalyst has a particle size of 0.01 to 100 μm.

6. The method of claim 1, further comprising:

obtaining a product after the heating the mixture solution; and washing and drying the product.

7. The method of claim 1, wherein the carbon raw material includes at least one selected from a group consisting of hydrocarbon and alcohol.

8. The method of claim 7, wherein the hydrocarbon is alkane.

9. The method of claim 7, wherein the alcohol is at least one selected from a group consisting of isopropyl alcohol, ethanol, and glycerol.

10. The method of claim 1, wherein a heating temperature in the heating the mixture solution is 600 to 1000° C.

11. The method of claim 2, wherein the dispersing the first liquid is performed by ultrasonic treatment or by a stirrer.

12. The method of claim 1, wherein the carbon nanotube has a diameter of 30 to 200 nm.

13. The method of claim 12, wherein the carbon nanotube has an $I_{2D}/I_D$ value of 0.2 to 1.0.

14. The method of claim 12, wherein the carbon nanotube has a surface area of 100 to 400 $m^2/g$.

15. The method of claim 12, wherein the carbon nanotube includes a micropore having a particle size of less than or equal to 2 nm and a mesopore having a particle size of greater than 2 nm and less than 50 nm, and the mesopore has a pore volume of 0.1 to 1.0 $cm^3/g$.

* * * * *